(12) United States Patent
Wright et al.

(10) Patent No.: US 12,256,000 B2
(45) Date of Patent: Mar. 18, 2025

(54) METHODS AND DEVICES FOR PUBLIC KEY MANAGEMENT USING A BLOCKCHAIN

(71) Applicant: NCHAIN LICENSING AG, Zug (CH)

(72) Inventors: Craig Steven Wright, London (GB); Wei Zhang, London (GB)

(73) Assignee: nChain Licensing AG, Zug (CH)

( * ) Notice: Subject to any disclaimer, the term of this patent is extended or adjusted under 35 U.S.C. 154(b) by 564 days.

(21) Appl. No.: 17/609,659

(22) PCT Filed: May 5, 2020

(86) PCT No.: PCT/IB2020/054259
§ 371 (c)(1),
(2) Date: Nov. 8, 2021

(87) PCT Pub. No.: WO2020/229947
PCT Pub. Date: Nov. 19, 2020

(65) Prior Publication Data
US 2022/0094542 A1    Mar. 24, 2022

(30) Foreign Application Priority Data
May 10, 2019   (GB) .................................... 1906637

(51) Int. Cl.
*H04L 9/30*   (2006.01)
*H04L 9/32*   (2006.01)

(52) U.S. Cl.
CPC .............. *H04L 9/30* (2013.01); *H04L 9/3236* (2013.01); *H04L 9/3263* (2013.01)

(58) Field of Classification Search
CPC ........ H04L 9/30; H04L 9/3236; H04L 9/3263
(Continued)

(56) References Cited

U.S. PATENT DOCUMENTS 10,755,237 B2 *  8/2020  Song ................... G06Q 20/3829
2018/0227293 A1 *  8/2018  Uhr ......................... G06Q 20/40
(Continued)

FOREIGN PATENT DOCUMENTS

CN    106372941           2/2017
CN    108667618 A  * 10/2018  ......... G06F 16/1824
(Continued)

OTHER PUBLICATIONS

Nguyen "Building mathematical models applied to UTXOs selection for objective transactions", Nov. 1, 2018 (Year: 2018).*
(Continued)

*Primary Examiner* — Michael R Vaughan
*Assistant Examiner* — Saad Ahmad Abdullah
(74) *Attorney, Agent, or Firm* — Messner Reeves LLP

(57) ABSTRACT

A blockchain network may be used to improve upon public-key infrastructure by providing for fast and secure registration, revocation and update of digital certificates. A public key may be recorded on the blockchain by a certificate authority in such a manner that any third party may quickly and easily verify that the public key is certified by the certificate authority and that the certification has not been revoked. The certificate authority may be able to revoke the certification nearly instantaneously, and/or may be able to simultaneously certify a new key for the same entity while revoking the old key. In some cases, the ability to revoke a certification may be given to the owner of the public key or, in some cases, to one or even a group of other entities.

17 Claims, 4 Drawing Sheets

(58) Field of Classification Search
USPC .......................................................... 713/171
See application file for complete search history.

(56) References Cited

U.S. PATENT DOCUMENTS

| | | | | |
|---|---|---|---|---|
| 2019/0207757 A1* | 7/2019 | Hennebert | ............ | H04L 9/0841 |
| 2021/0158346 A1* | 5/2021 | Liu | ...................... | G06Q 20/223 |
| 2022/0129893 A1* | 4/2022 | Wright | ................. | G06Q 20/065 |

FOREIGN PATENT DOCUMENTS

| | | | | |
|---|---|---|---|---|
| CN | 108964924 | | 12/2018 | |
| CN | 108964924 A | * | 12/2018 | ......... H04L 63/0823 |
| JP | 2018117287 A | | 7/2018 | |
| KR | 20200080263 A | * | 11/2017 | ............. H04L 63/04 |
| WO | 2017187395 | | 11/2017 | |
| WO | 2017287395 | | 11/2017 | |
| WO | 2019023470 | | 1/2019 | |

OTHER PUBLICATIONS

International Search Report for PCT/IB2020/054259 dated Jun. 17, 2020.
Combined Search and Exam report for application GB1906637.2 dated Oct. 22, 2019.
Higashikado Y., et al., "A Study on Certificate Management in Consortium Chain," in 2017 Symposium on Cryptography and Information Security, the Institute of Electronics, Information and Communication Engineers, Japan, Jan. 24, 2017, pp. 1-4.
Tagomori T., "Introduction to Bitcoin Technology—for Robust System Development and Operations," 1st Edition, Gijutsu-hyoron Co., Ltd., Aug. 9, 2018, pp. 118-119.

* cited by examiner

METHODS AND DEVICES FOR PUBLIC KEY MANAGEMENT USING A BLOCKCHAIN

CROSS REFERENCE TO RELATED APPLICATIONS

This application is a U.S. National Stage of PCT Application No. PCT/IB2020/054259 filed on May 5, 2020 which claims the benefit of United Kingdom Application No. 1906637.2, filed on May 10, 2019, the entire contents of which are incorporated herein by reference.

TECHNICAL FIELD

The present disclosure relates to blockchain networks and, in particular, to the use of a blockchain to facilitate public key management for a public key infrastructure.

BACKGROUND

In a public key infrastructure, a computing device may have a public-private key pair to facilitate secure communications, digital signatures, non-repudiation, and other functions. As a part of the public key infrastructure, the computing device may have its public key registered with a certification authority, which provides the computing device with a digital certificate confirming ownership and authorization of the public key.

A problem with the use of certification authorities is that once they have issued a digital certificate then it remains valid until its specified expiry date. However, the public key may become compromised, necessitating revocation of the certification. To address that issue, certification authorities maintain "revocation lists" detailing which digital certificates should be considered revoked, and they regularly update and publish these lists. An entity wishing to validate a public key may rely on the digital certificate, but must also then obtain and review a corresponding certificate revocation list to see if the digital certificate has been invalidated by the certification authority. This system and its inherent delays means that some digital certificates may be revoked and that revocation may not yet be published or available to an entity that intends to rely on that digital certificate.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLES

Figure 1:
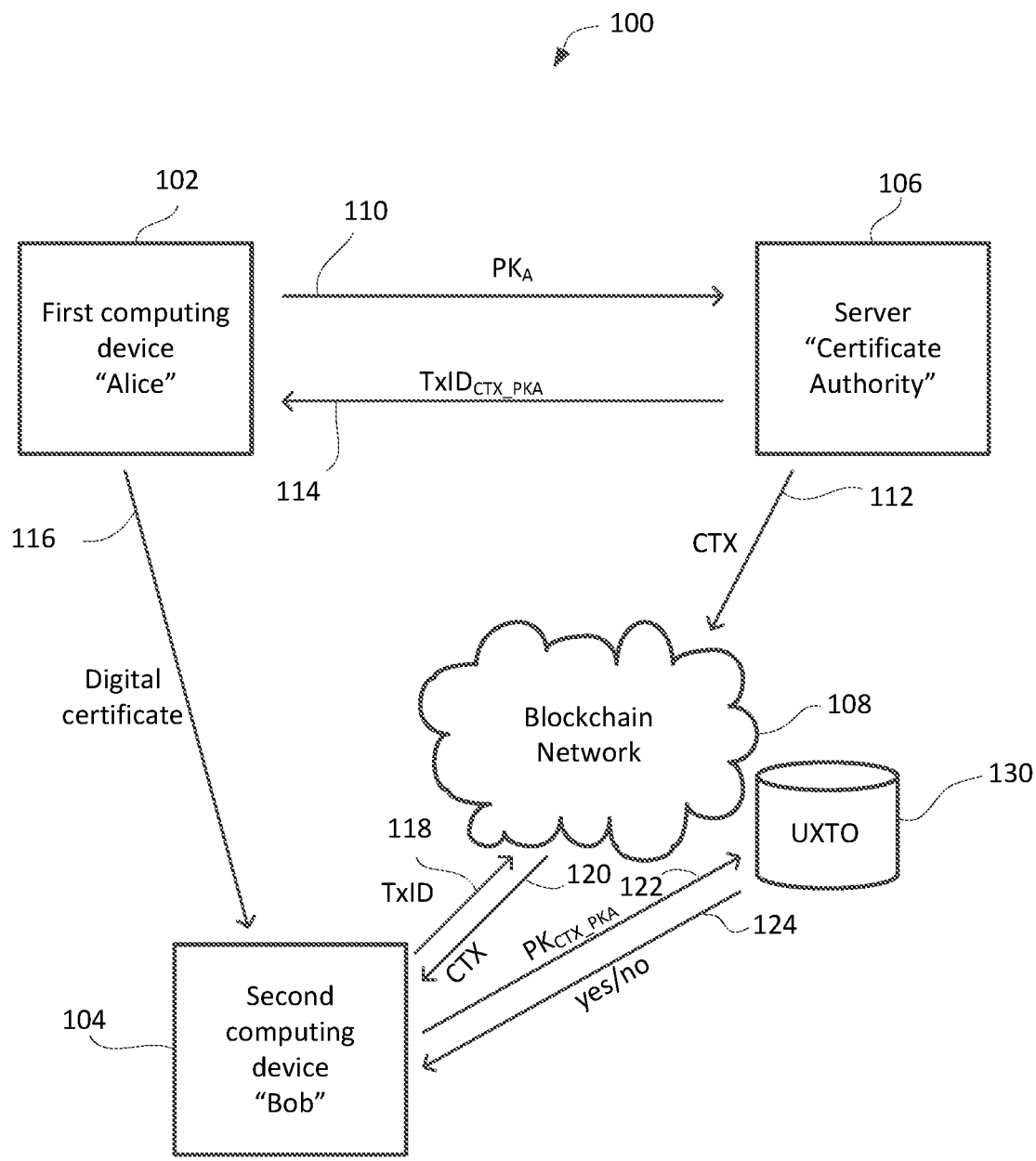
FIG. 1 shows an example block structure for a blockchain network.

In one aspect, there may be provided a computer-implemented method of managing public key infrastructure using a blockchain network. The method may include generating a digital certificate for a first entity, the first entity having a first public key, by creating a certification transaction, wherein the certification transaction includes a digital signature from a certificate authority, a first output to an address based on a second public key, and a second output having an information field that contains the first public key; determining a certification transaction identifier from a hash of the certification transaction; and propagating the certification transaction on the blockchain network. The digital certificate includes the first public key and the certification transaction identifier.

In some implementations, the second output includes an OP_RETURN field that contains at least the first public key. In some implementations, the first output includes a pay-to-public-key-hash (P2PKH) operation referencing an address obtained as a hash of the second public key. In some implementations, the certificate authority holds a second private key corresponding to the second public key.

In some implementations the method may further include verifying the digital certificate. Verifying the digital certificate may include obtaining a copy of the certification transaction from a blockchain based on the certification transaction identifier in the digital certificate; determining that the first output is an unspent transaction output; and determining that the first public key contained in the second output in the certification transaction matches a public key in the digital certificate. In some such implementations, determining that the first output is an unspent transaction output includes determining that the first output is present in an unspent transaction output pool of the blockchain network. In some such implementations, an input to the certification transaction may further include a certificate authority public key, and wherein verifying the digital certificate may further include determining that the certification transaction is signed by the certificate authority based on the certificate authority public key.

In some implementations, the method may further include revoking the digital certificate by generating a revocation transaction that includes, as an input, the first output of the certification transaction, and propagating the revocation transaction on the blockchain network.

In some implementations, the method may further include replacing the digital certificate with a new digital certificate for a new public key. Replacing may include creating a new certification transaction, wherein the new certification transaction includes as an input the first output of the certification transaction, a first new output to an new address based on a third public key, and a second new output having the information field, wherein the information field contains the new public key; determining a new certification transaction identifier from hashing the new certification transaction; and propagating the new certification transaction on the blockchain network. The new digital certificate may include the new public key and the new certification transaction identifier.

In some implementations, the information field is an OP_RETURN output.

In some implementations, the certification transaction includes an input referencing an unspent transaction outpoint address obtained from a hash of a certificate authority public key, and wherein the certification transaction includes an unlocking script for the unspent transaction outpoint address that includes the certificate authority public and the digital signature, and wherein the digital signature is generated based on a private key corresponding to the certificate authority public key.

In some implementations, the first output includes a multi-sig locking script enabling any one of two or more private keys to utilize the first output.

In a further aspect, the present application describes a computer-implemented method of verifying a digital certificate using a blockchain network. The digital certificate including a first public key and a certification transaction identifier. The method may include receiving the digital certificate from a first entity and obtaining a copy of the certification transaction from a blockchain based on the certification transaction identifier in the digital certificate, wherein the certification transaction includes a digital signature from a certificate authority, a first output to an address based on a second public key, and a second output having an information field. The method may further include determining that the information field contains a public key that matches the first public key in the digital certificate; querying an unspent transaction output pool to determine that the first output in the certification transaction has not been used in any subsequent transaction; and, based on those determinations, verifying that the first public key is certified valid.

In another aspect, there may be provided a computing device implementing a node in a network. The computing device may include memory, one or more processors, and computer-executable instructions that, when executed, cause the processors to carry out one or more of the methods described herein.

In yet another aspect, there may be provided a computer-readable medium storing processor-executable instructions for operating a node in a network, the processor-executable instructions including instructions that, when executed by one or more processors, cause the processors to carry out at least one of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application will refer to hashing or a hash function, which is intended to include any one of a number of cryptographic hash functions that, when applied to an arbitrary set of data or "message", deterministically produce a unique fixed-length alphanumeric string. The result of a hash function may be called a hash value, fingerprint, hash result, or equivalent. Examples include, but are not limited to, SHA-2, SHA-3, and BLAKE2.

In this document the term 'blockchain' is understood to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin, as exemplified by the Bitcoin SV protocol, may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented using a computer-based decentralised, distributed system. The blockchain is made up of blocks which in turn are made up of transactions. Each transaction is a data structure that encodes, among other possible information, the transfer of control of a digital asset between participants in the blockchain system and includes at least one input and at least one output. Each block header contains a summary of the block's contents, such as in the form of a Merkle root, and each block header contains a hash of the previous block header so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

The blockchain is implemented over a network of nodes. Each node is a computing device with network connectivity and executing software that carries out the applicable blockchain protocol. Nodes validate transactions and propagate them to other nodes in the network. Specialized network nodes, termed "mining nodes" or "miners", collect a set of unconfirmed transactions, i.e. pending transactions, into a block and attempt to "mine" the block. Mining, in these examples, refers to solving a proof-of-work (POW) before any other miner in the network succeeds in solving a proof-of-work for their respective block. In the Bitcoin example, a POW involves hashing a block header containing a nonce until the result is below a threshold value set by a difficultly parameter. The nonce is repeated incremented and the hashing repeated until the result is below the threshold value or until the miner receives notice that another miner has succeeded. Variations in mining process will be familiar to those ordinarily skilled in the art.

Among the various things that are checked when validating a transaction, a node determines whether the inputs to a transaction are valid. In particular, the node evaluates whether the unlocking script evaluates as true and determines whether the input references an "unspent transaction output" (UTXO) from an earlier transaction. Some nodes may maintain a running list or pool of UTXO to enable fast determination of whether a referenced transaction output is in the UTXO or not. A transaction may be identified by its unique transaction identifier, TxID, which in some implementations is a hash of the transaction. Some transactions may have more than one output, so a unique transaction output (i.e. an outpoint) may be identified by the TxID and an index, where the index point to one of the outputs in the ordered set of outputs from the transaction. If the transaction output is present in the UTXO pool, then the output of that transaction is "unspent" and available to serve as an input.

The unlocking script for a transaction outpoint defines how "control" over that output is to be proven in order to be exercised. In many cases, the address associated with a transaction output is a hash of a public key. To prove control over that output, an unlocking script often requires the public key and a digital signature generated using the corresponding private key. In this manner, the node that controls the private key is able to control when and how the transaction output is used in any subsequent input. As will be discussed further below, this has the corollary that when a transaction input corresponding to a particular public key includes a digital signature generated using the corresponding private key, then the entity associated with that particular public key is effectively signing or certifying the transaction contents.

Public-key cryptography has become ubiquitous in online communications. In many instances, a process and policy is needed to provide certainty that a public key is owned by an associated with a particular entity. The most common approach to ensuring that a public key is authentic and has not been compromised is a public key infrastructure (PKI). PKI relies upon a trusted third party to "authenticate" public keys as valid. These entities are "certificate authorities" (CAs). The CAs provide for registration and issuance of digital certificates that confirm the binding between a public key and a particular owner. The holder of a public key provides another entity with its public key and its digital certificate. The other entity may then verify the authenticity of the public key by confirming that a trusted CA has digitally signed the public key as belonging to the holder.

One of the problems with existing PKI is that sometimes a public key becomes compromised, for example if the private key is lost or disclosed before a certificate's specified expiry date. For that reason, the CA may maintain a certificate revocation list. Any entity wishing to rely upon a certificate associated with a public key must then also seek out and review an associated certificate revocation list to confirm that the certificate has not been revoked by the CA. This compromises the ability to authenticate keys offline and creates risks due to the delay between revocation and publication of a new certificate revocation list, which is often 24 hours or more.

In accordance with one aspect of the present application, a blockchain network may be used to improve upon public-key infrastructure by providing for fast and secure validation, revocation and update of digital certificates. A public key may be recorded on the blockchain by a certificate authority in such a manner that any third party may quickly and easily verify that the public key is certified by the certificate authority and that the certification has not been revoked. By recording the public key in the manner described below, the certificate authority may be able to revoke the certification nearly instantaneously, or may be able to simultaneously certify a new key for the same entity while revoking the old key. In some cases, the ability to revoke a certification may be given to the owner of the public key or, in some cases, to one or even a group of other entities.

Reference will now be made to FIG. 1, which diagrammatically illustrates an example system 100 for managing a public key infrastructure. The system 100 in this example includes a first computing device 102, a second computing device 104, and a server 106. The first computing device 102 and the second computing device 104 may be implemented by way of any network-enabled computing device, including servers, personal computers, tablets, smartphones, connected cars, Internet-of-things devices, or any other such devices. The server 106 is operated by a certificate authority (CA) and is configured to receive and respond to requests for digital certificates. Although the CA is depicted as being implemented by the server 106, it will be understood that the CA functions may be implemented by one or more servers or other computing devices.

The system 100 further includes a blockchain network 108. The blockchain network 108 includes a network of nodes operating in accordance with an applicable blockchain protocol. In some implementations, one or more of the first computing device 102, the second computing device 104, and/or the server 106 may also be nodes in the blockchain network 108, although in the present example they are depicted as being nodes separate from the blockchain network 108 for ease of explanation.

In this example system 100, the first computing device 102, labelled "Alice", has a public-private key pair for using in asymmetric cryptographic communications. To use the public key in some cryptographic scenarios, Alice may need to have a corresponding digital certificate authenticating the public key and its association with Alice. Accordingly, in operation 110, Alice provides the public key $PK_A$ to the CA with a request for registration. The CA may engage in some level of authentication to ensure Alice's identity as owner of the public key. In some cases, this authentication may be automated online operations carried out by the server 106 based on the data provided in operation 110. In some cases, this authentication may also or alternatively include offline authentication operations. Two-factor authentication and other such techniques may be employed.

Once the CA determines that the public key $PK_A$ is to be certified, it generates a blockchain transaction, the "certification transaction" (CTX), that includes the public key $PK_A$ and that is signed by the CA. That certification transaction further includes an output controlled by the CA. The transaction is submitted to the blockchain network 108 as indicated by operation 112. The CA then provides Alice with the certification transaction identifier $TxID_{CTX\_PKA}$ in operation 114. In some implementations, Alice may obtain a copy of the certification transaction from the blockchain network 108 based on the transaction identifier to confirm that it conforms to expectations and contains the public key $PK_A$.

The transaction identifier $TxID_{CTX\_PKA}$, together with the public key $PK_A$, effectively form a digital certificate for Alice. In connection with some communication with the second communication device 104, which in this example is labelled "Bob", Alice may transmit its digital certificate to Bob in operation 116. Bob is then able to authenticate the public key $PK_A$ and verify that the certification has not been revoked based on the blockchain maintained by the blockchain network 108.

In particular, in operations 118 and 120, Bob may request and receive a copy of the certification transaction. From the certification transaction, Bob may verify that it contains Alice's purported public key $PK_A$, and that it has been signed by a trusted certification authority. Bob is further able to verify that the certification has not been revoked by querying whether the transaction output controlled by the CA remains "unspent", i.e. that the transaction output point is present in a UTXO pool 130 for the blockchain network 108, as indicated by operations 122 and 124. The UTXO pool 130 is a pool of "unspent" transaction output points maintained by any one of a number of nodes of the blockchain network 108.

Figure 2:
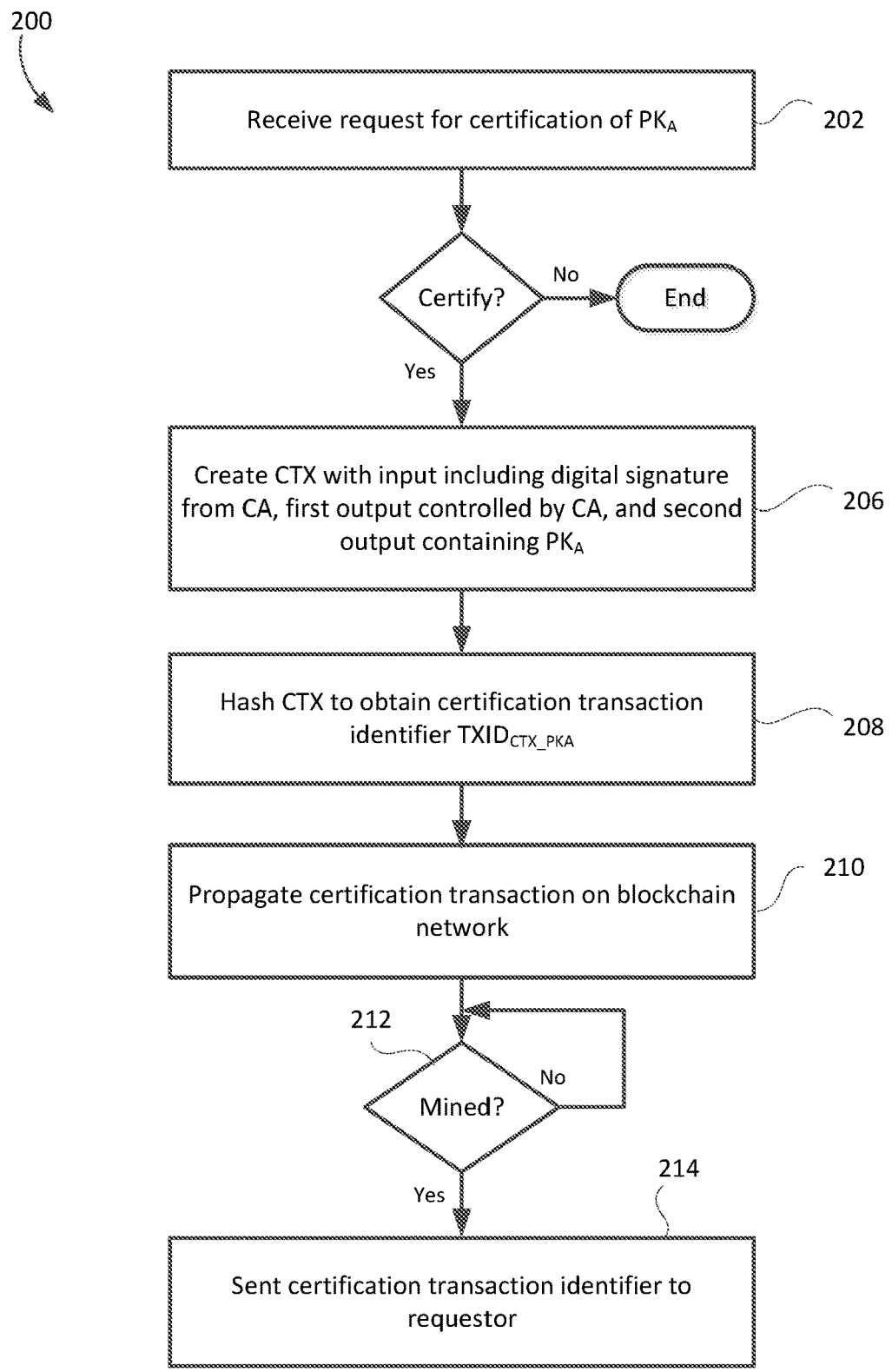
FIG. 2 shows a flowchart of an example method of block propagation.

Reference will now be made to FIG. 2, which shows in flowchart form, one example method 200 for registering a public key with a certification authority. The example method 200 is implemented by an authorized certification authority, and may be implemented by one or more servers suitably programmed to carry out the functions described.

In operation 202, the certification authority receives a request from Alice for certification of a public key, $PK_A$. The certification authority may carry out authentication or authorization protocols in accordance with its applicable policies. Those protocols may include automated computer-implemented operations and/or administrator-facilitated operations. Regardless of the specific authentication operations, in operation 204 a determination is made as to whether to certify the public key for Alice. If not, then the method 200 ends. If certification will be granted, then in operation 206 the certification authority creates a certification transaction. As noted above, the certification transaction includes an input that includes the certification authority's public key and a digital signature from the certification authority, an output controlled by the certification authority, and the public key $PK_A$. To provide a specific example, the input may be a UTXO of some nominal or arbitrary value for which the certification authority has the private key to generate a signature in a valid unlocking script. The UTXO may be associated with sufficient digital value to offset any transaction fee due for mining the certification transaction.

The certification transaction may include two outputs: a first one based on a CA public key $PK_{CTX\_PKA}$ selected by and controlled by the certification authority, and second one that contains the public key $PK_A$ in, for example, a non-operational information field. An example of the latter is an OP_RETURN function in Bitcoin. OP_RETURN is effectively an output into which arbitrary data may be placed for recordal on the blockchain once the transaction is mined.

The first output may be, for example, a P2PKH (pay to public key hash) operation specifying transfer to a public key hash (e.g. a Bitcoin address) selected and controlled by the certification authority.

By way of its digital signature in the transaction, the certification authority both authorizes input of the UTXO to the transaction, thereby satisfying the unlocking script, and provides verifiable evidence that the certification authority has certified the public key $PK_A$ appearing in the OP_RETURN output. Note that in some implementations additional information may appear in the OP_RETURN output field, such as a digital signature from Alice, or other such data.

Once the certification transaction has been created, the certification authority hashes the transaction to find the transaction identifier $TxID_{CTX\_PKA}$ in operation 208 and it propagates the transaction on the blockchain network as indicated by operation 210. It will be appreciated that "propagating" the transaction includes submitting it to a node of the blockchain network, where it is verified and then transmitted to all other nodes, which in turn verify and re-transmit, until the transaction has reached substantially all nodes in the network. In some embodiments, the certification authority is, itself, one of the nodes in the blockchain network.

In operation 212, the certification authority awaits mining of a block containing the certification transaction, i.e. a "confirmation" of the transaction, and then transmits the transaction identifier $TxID_{CTX\_PKA}$ to Alice in operation 214. In some implementations, the certification authority may provide the transaction identifier to Alice prior to the transaction being mined.

Alice is then able to provide any third parties with a digital certificate that includes Alice's public key $PK_A$ and the certification transaction identifier $TxID_{CTX\_PKA}$. From this, the third party may verify that Alice's public key is certified by a CA.

A simplified example of a certification transaction is shown below:

It will be noted that the unlocking script for the input includes the certification authority's public key and a signature generated by the certification authority. Alice's public key $PK_A$ appears in the OP_RETURN field as the second output. The first output is any public key hash controlled by the certification authority.

Figure 3:
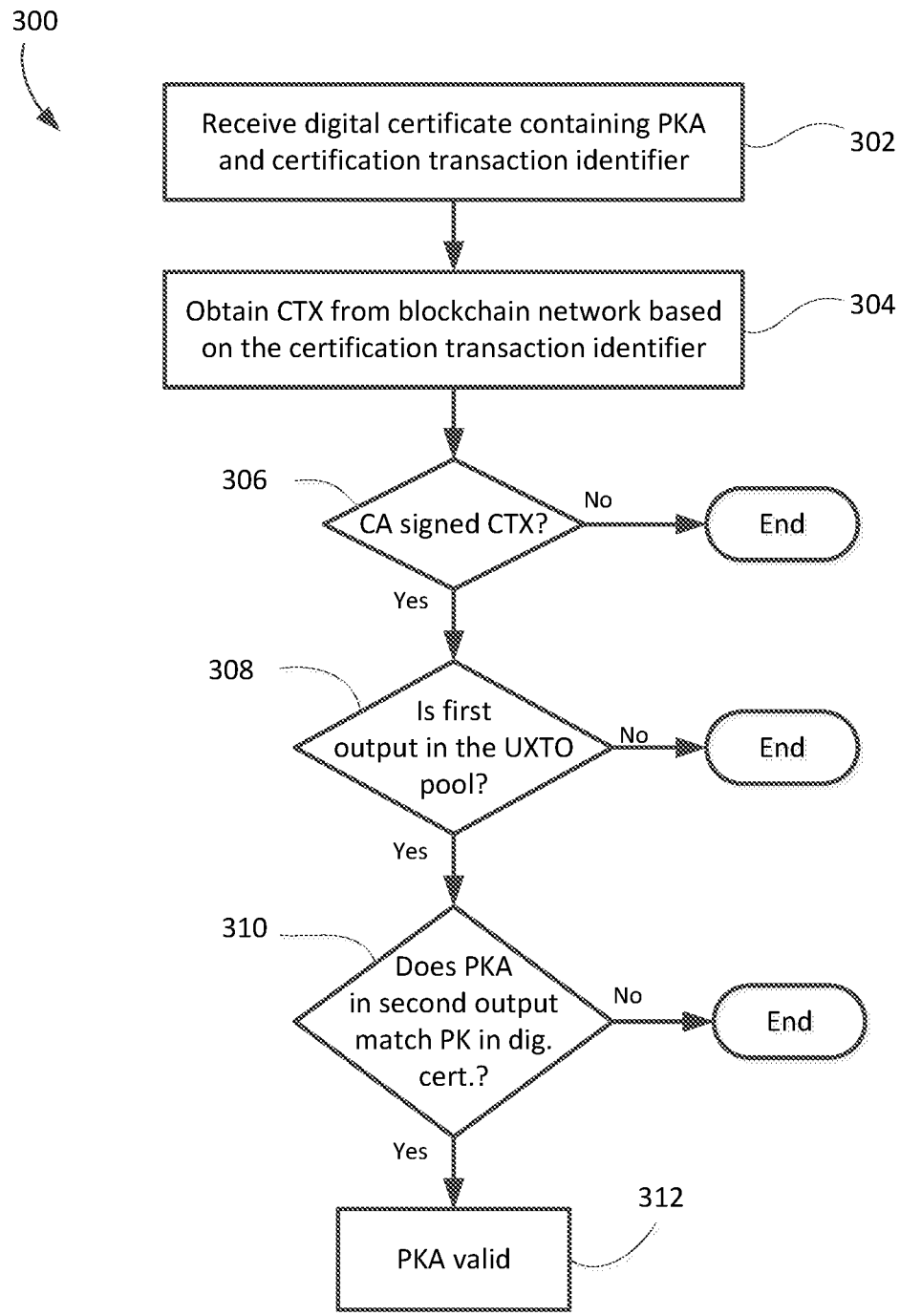
FIG. 3 shows, in flowchart form, one example method of verifying a public key.

Reference is now made to FIG. 3, which shows one example method 300 of verifying a public key. The operations described in the example method 300 may be carried out by a computing device attempting to verify a public key purporting to be certified using the process exemplified in FIG. 2. Example computing devices include any network-enabled computing device.

The method 300 includes, in operation 302, receiving the digital certificate for another entity, such as the first computing device 102 (FIG. 1) labelled "Alice". The digital certificate includes at least the public key $PK_A$ and the certification transaction identifier $TxID_{CTX\_PKA}$. Using the certification transaction identifier, the certification transaction is obtained from the blockchain network in operation 304. It will be appreciated that the certification transaction may be obtained from a copy of the blockchain, whether that copy is local to the computing device or whether it is maintained by a node in the blockchain network. In the unlikely event that the transaction has not yet been confirmed, i.e. is not yet in a mined block, then the transaction may be present in the mempool of unconfirmed transactions; however, in many implementations the certification authority may only provide Alice with the certification transaction identifier after the certification transaction has been mined.

From the certification transaction, the computing device may verify certain things. In particular, in operation 306, the computing device may verify that the certification transaction is signed by a certification authority. The computing device may have, or have access to, a list of recognized or accredited certification authorities and their respective public keys, which may enable the computing device to validate a digital signature. The digital signature may form part of an input to the certification transaction, as described. By confirming that the certification transaction is signed by a trusted or recognized certification authority, the computing device is able to confirm that the certification is legitimate. Note that the computing device does not necessarily need to verify the digital signature in the input if the transaction is on the blockchain, because it will have been confirmed and verified by miners. Rather, the computing device may simply verify that the public key identified in the input is associated with the certification authority.

The computing device may further verify that one of the output points of the certification transaction remains "unspent", i.e. that output point is found in the UTXO pool, as indicated by operation 308. This verification operation confirms that the certification remains valid and unrevoked. As discussed above, this output point is controlled by the certification authority in most embodiments (alternatives are described below), which enables the certification authority to cancel a certification if the key is compromised, expired,

| Certificate Transaction-$TXID_{CTX\text{-}PKA}$ | |
|---|---|
| Input 1: | Output 1: |
| Outpoint (transaction id and output index): CA's unspent outpoint<br>Unlocking script: < CA's Sig >< CA's PK ><br>Sequence number: 0xFFFFFFFF | P2PKH (the hash of CA's public key, can be different from CA's PK in the input)<br>Output 2:<br>OP_RETURN $PK_A$ | or otherwise no longer valid. Revocation or cancelation is easily facilitated by having the certification authority "spend" the output point, thereby removing it from the UTXO pool. Confirmation that the output point is present in the UTXO pool may be carried out by, for example, querying the UTXO pool based on the TxID number and an output index. In some examples, the computing device may query the UTXO pool through an intermediary, such as a node of the blockchain network.

In operation 310, the computing device confirms that the public key $PK_A$ in the second output of the certification transaction matches the public key $PK_A$ received as part of the digital certificate from Alice.

If operations 306, 308 and 310 are all confirmed, then the computing device determines that the public key $PK_A$ in the received digital certificate from Alice is valid in operation 312.

By using the blockchain network to record public key certification, certification authorities are able to quickly and easily revoke a certification by "spending" the output point, such that the verification at operation 308 fails. Accordingly, a certification authority may revoke certification of a public key by generating and propagating a transaction that uses the first output of the certification transactions. As discussed above, the first output may be a P2PKH operation that transfers a nominal digital asset to the public key hash address specified in the first output. The unlocking script for that first output may, in these examples, require a digital signature from the certification authority, which requires control over the private key corresponding to the CA public key $PK_{CTX\_PKA}$ used in the P2PKH operation.

In some cases, the certification authority may not simply revoke a certification, but may be asked to replace/update a certified public key. For example, if the private key is lost or compromised, then the owner (e.g. Alice) may request that the certification authority update or replace the previously-certified public key with a new public key $PK_{A\_new}$. The certification authority authenticates the request using whatever online or offline authentication mechanisms are in place and, if it determines that the update operation is to occur, then it creates a new certification transaction $CTX_{new}$ to both revoke the old certification and issue a new certification.

The new certification transaction features the same types of outputs, i.e. a P2PKH operation using a new public key selected by the CA, such as $PK_{CTX\_new}$, and an OP_RETURN field containing $PK_{A\_new}$. However, the input may include the CA-controlled output point from the original certification transaction $TxID_{CTX\_PKA}$. By "spending" that output as the input to the new certification transaction, the revocation is effected by removing that output point from the UXTO pool. Advantageously, the revocation of the old public key certification and the registration of the new public key certification occur in a single transaction. Moreover, no separate periodically published list of certificate revocations needs to be maintained and made available by the certification authority.

As mentioned above, in many cases the first output point of a certification transaction may be controlled by a certification authority, such that only the certification authority is able to revoke the certification of the public key. Revocation is based on "spending" the first output point using the private key corresponding to that output point. In some cases, however, it may be advantageous to structure the certification transaction to permit other entities to revoke the certification.

For example, in some situations the owner of the public key, e.g. Alice, may have the authority to revoke its own public key. In this arrangement, the first output point in the certificate transaction is controlled by Alice, i.e. references a public key (public key hash) for which Alice has the corresponding private key. That is, the unlocking script for the first output point requires a digital signature from Alice. This arrangement may be advantageous for some public key certification scenarios, such as registration with an online service. One example of an online service is a social media account on a social media platform. The platform may use the above-described mechanism to register a user's public key for use with the platform, enabling the user to interact with the platform and/or other users of the platform on a trusted basis due to their digital certificate backed up via the certification transaction. The user is then able to revoke the certification so as to terminate their account without cooperation of the platform.

In another scenario, more than one output point may be provided either one of which may be "spent" so as to terminate the certification. In such a scenario, third parties are configured to test both (or all) such output points of a certification transaction for their presence as unspent transaction outputs in the UTXO pool.

Alternatively, if revocation from any one of multiple parties is to be facilitated, then the first output may be configured to use multiple signatures, i.e. where any one of a number of signatures may be used to "spend" the output. For this purpose, Multi-sig may be used in the output.

In yet another scenario, multi-sig may be configured to ensure that at least a threshold number of entities agree to revoke the certification. Multi-sig may be configured to require n out of m signatures to unlock an output, wherein $n \leq m$. As an example, in the case of an organization, such as a business, partnership or other such collection of individuals, a certified public key associated with the organization may be revocable only if all or at least a threshold number of certain entities sign off on the revocation, such as the CEO, COO, CTO, or other executives or individuals involved in the business.

It will be appreciated that it may be that some or all of the above-described operations of the various above-described example methods may be performed in orders other than those illustrated and/or may be performed concurrently without varying the overall operation of those methods.

Figure 4:
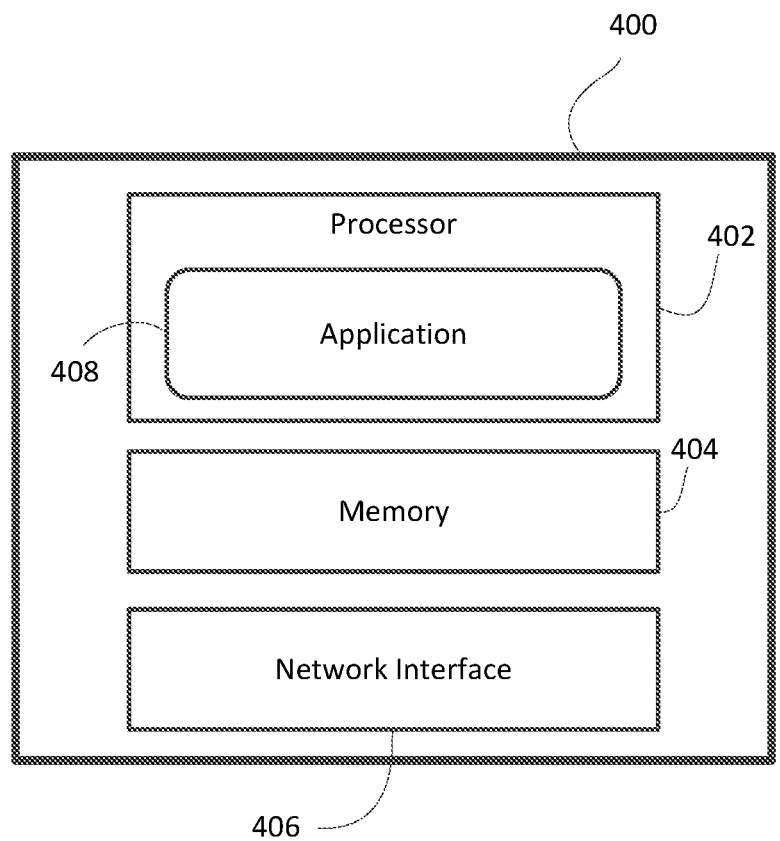
FIG. 4 shows, in block diagram form, a simplified example of a mining node.

Reference is now made to FIG. 4, which shows, in block diagram form, a simplified computing device 400, in accordance with an example of the present application. The computing device 400 may carry out one or more of the above-described functions. In this sense it may serve as the first computing device 102 (FIG. 1), the second computing device 104 (FIG. 1), or the server 106 (FIG. 1) in some implementations.

The computing device 400 includes a processor 402, which may include one or more microprocessors, application specific integrated circuits (ASICs), microcontrollers, or similar computer processing devices. The computing device 400 may further include memory 404, which may include persistent and non-persistent memory, to store values, variables, and in some instances processor-executable program instructions, and a network interface 406.

The computing device 400 may include a processor-executable application 408 containing processor-executable instructions that, when executed, cause the processor 402 to carry out one or more of the functions or operations described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of managing public key infrastructure using a blockchain network, comprising:
   at a certification authority, generating a digital certificate for a first entity, the first entity having a first public key, by:
      creating a certification transaction, wherein the certification transaction includes a digital signature from a certificate authority, a first output to an address based on a second public key, and a second output having an information field that contains the first public key;
      determining a certification transaction identifier from a hash of the certification transaction; and
      propagating the certification transaction on the blockchain network,
      wherein the digital certificate includes the first public key and the certification transaction identifier; and
   at a computing device, verifying the digital certificate by:
      obtaining a copy of the certification transaction from a blockchain based on the certification transaction identifier in the digital certificate;
      determining that the first output is an unspent transaction output, wherein determining that the first output is an unspent transaction output includes verifying that the first output of the certification transaction is present in an unspent transaction output pool of the blockchain network and thus has not been used in any subsequent transaction;
      determining that the first public key contained in the second output in the certification transaction matches a public key in the digital certificate; and
      in response to the determination that the first output is an unspent transaction output and to the determination that the first public key matches the public key in the digital certificate, verifying the digital certificate as valid.

2. The method of claim 1, wherein the second output includes an OP_RETURN field that contains at least the first public key.

3. The method of claim 1, wherein the first output includes a pay-to-public-key-hash (P2PKH) operation referencing an address obtained as a hash of the second public key.

4. The method of claim 1, wherein the certificate authority holds a second private key corresponding to the second public key.

5. The method of claim 1, wherein an input to the certification transaction further includes a certificate authority public key, and wherein verifying the digital certificate further includes determining that the certification transaction is signed by the certificate authority based on the certificate authority public key.

6. The method of claim 1, further comprising revoking the digital certificate by generating a revocation transaction that includes, as an input, the first output of the certification transaction, and propagating the revocation transaction on the blockchain network.

7. The method of claim 1, further comprising replacing the digital certificate with a new digital certificate for a new public key by:
   creating a new certification transaction, wherein the new certification transaction includes as an input the first output of the certification transaction, a first new output to an new address based on a third public key, and a second new output having the information field, wherein the information field contains the new public key;
   determining a new certification transaction identifier from hashing the new certification transaction; and
   propagating the new certification transaction on the blockchain network,
   wherein the new digital certificate includes the new public key and the new certification transaction identifier.

8. The method of claim 1, wherein the information field is an OP_RETURN output.

9. The method of claim 1, wherein the certification transaction includes an input referencing an unspent transaction outpoint address obtained from a hash of a certificate authority public key, and wherein the certification transaction includes an unlocking script for the unspent transaction outpoint address that includes the certificate authority public and the digital signature, and wherein the digital signature is generated based on a private key corresponding to the certificate authority public key.

10. The method of claim 1, wherein the first output includes a multi-sig locking script enabling any one of two or more private keys to utilize the first output.

11. A computing system configured to manage a public key infrastructure using a blockchain network, the computing system including:
   a certification authority including one or more processors; and memory storing computer-executable instructions that, when executed by the one or more processors, cause the one or more processors to carry out the method of:
   generating a digital certificate for a first entity, the first entity having a first public key, by:
      creating a certification transaction, wherein the certification transaction includes a digital signature from a certificate authority, a first output to an address based on a second public key, and a second output having an information field that contains the first public key;
      determining a certification transaction identifier from a hash of the certification transaction; and
      propagating the certification transaction on the blockchain network,
      wherein the digital certificate includes the first public key and the certification transaction identifier; and
   a computing device including one or more processors and memory storing computer executable instructions that, when executed by the one or more processors are to cause the one or more processors to verify the digital certificate by:
      obtaining a copy of the certification transaction from a blockchain based on the certification transaction identifier in the digital certificate;
      determining that the first output is an unspent transaction output, wherein determining that the first output is an unspent transaction output includes verifying that the first output of the certification transaction is present in an unspent transaction output pool of the blockchain network and thus has not been used in any subsequent transaction;

determining that the first public key contained in the second output in the certification transaction matches a public key in the digital certificate; and in response to the determination that the first output is an unspent transaction output and to the determination that the first public key matches the public key in the digital certificate, verifying the digital certificate as valid.

12. The computing system of claim 11, wherein the second output includes an OP_RETURN field that contains at least the first public key.

13. The computing system of claim 11, wherein the first output includes a pay-to-public-key-hash (P2PKH) operation referencing an address obtained as a hash of the second public key.

14. The computing system of claim 11, wherein the certificate authority holds a second private key corresponding to the second public key.

15. The computing system of claim 11, wherein determining that the first output is an unspent transaction output includes determining that the first output is present in an unspent transaction output pool of the blockchain network.

16. A non-transitory computer-readable medium storing processor-executable instructions for managing a public key infrastructure using a blockchain network, the processor-executable instructions including instructions that, when executed by one or more processors, cause the processors to perform a method of:

generating a digital certificate for a first entity, the first entity having a first public key, by:
creating a certification transaction, wherein the certification transaction includes a digital signature from a certificate authority, a first output to an address based on a second public key, and a second output having an information field that contains the first public key;
determining a certification transaction identifier from a hash of the certification transaction; and
propagating the certification transaction on the blockchain network,
wherein the digital certificate includes the first public key and the certification transaction identifier; and
verifying the digital certificate by:
obtaining a copy of the certification transaction from a blockchain based on the certification transaction identifier in the digital certificate;
determining that the first output is an unspent transaction output, wherein determining that the first output is an unspent transaction output includes verifying that the first output of the certification transaction is present in an unspent transaction output pool of the blockchain network and thus has not been used in any subsequent transaction;
determining that the first public key contained in the second output in the certification transaction matches a public key in the digital certificate; and
in response to the determination that the first output is an unspent transaction output and to the determination that the first public key matches the public key in the digital certificate, verifying the digital certificate as valid.

17. A computer-implemented method of verifying a digital certificate using a blockchain network, the digital certificate including a first public key and a certification transaction identifier, the method comprising:

receiving the digital certificate from a first entity;
obtaining a copy of the certification transaction from a blockchain based on the certification transaction identifier in the digital certificate, wherein the certification transaction includes a digital signature from a certificate authority, a first output to an address based on a second public key, and a second output having an information field;
determining that the information field contains a public key that matches the first public key in the digital certificate;
querying an unspent transaction output pool to determine that the first output in the certification transaction has not been used in any subsequent transaction, wherein determining that the first output is an unspent transaction output includes verifying that the first output of the certification transaction is present in the unspent transaction output pool and thus has not been used in any subsequent transaction;
in response to the determination that the first output is an unspent transaction output and to the determination that the public key matches the first public key in the digital certificate, verifying that the first public key is certified valid.

* * * * *